(12) United States Patent
Moosmann et al.

(10) Patent No.: US 6,801,006 B2
(45) Date of Patent: Oct. 5, 2004

(54) CONTROL DEVICE AND METHOD FOR OPERATING A WINDOW WIPER APPARATUS WITH OPERATING-POINT-DEPENDENT WIPING ANGLE ADAPTATION

(75) Inventors: Johannes Moosmann, Buehlertal (DE); Hartmut Krueger, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/320,299

(22) Filed: Dec. 16, 2002

(65) Prior Publication Data

US 2003/0117102 A1 Jun. 26, 2003

(30) Foreign Application Priority Data

Dec. 19, 2001 (DE) .......................................... 101 62 677
Oct. 29, 2002 (DE) .......................................... 102 50 322

(51) Int. Cl.[7] ................ H02P 1/04; B60S 1/02
(52) U.S. Cl. ................ 318/444; 381/443; 381/DIG. 2; 15/250.01
(58) Field of Search ................ 318/443–445, 318/465, 286, 461, 483, DIG. 2; 15/250.001, 250.12, 250.13, 250.17, 250.16

(56) References Cited

U.S. PATENT DOCUMENTS

| | | | | |
|---|---|---|---|---|
| 4,585,980 A | * | 4/1986 | Gille et al. | .................. 318/444 |
| 4,614,903 A | * | 9/1986 | Betsch et al. | ................ 318/443 |
| 4,723,101 A | * | 2/1988 | Bauer et al. | ................ 318/443 |
| 4,934,014 A | * | 6/1990 | Yamamoto | ................ 15/250.13 |
| 5,177,418 A | * | 1/1993 | Muller | ........................ 318/265 |
| 5,287,585 A | * | 2/1994 | Yamamoto et al. | ....... 15/250.13 |
| 5,333,351 A | * | 8/1994 | Sato | .......................... 15/250.13 |
| 5,355,061 A | * | 10/1994 | Forhan | ........................ 318/443 |
| 5,982,123 A | * | 11/1999 | Hornung et al. | ............. 318/443 |
| 6,249,098 B1 | * | 6/2001 | Miyazaki et al. | ............ 318/280 |
| 6,388,411 B1 | * | 5/2002 | Ostrowski | ..................... 318/461 |
| 6,657,410 B1 | * | 12/2003 | Berger et al. | ................ 318/483 |

FOREIGN PATENT DOCUMENTS

| | | | | |
|---|---|---|---|---|
| EP | 0 700 342 B1 | 1/1999 | | |
| JP | 03104754 A | * | 5/1991 | ............. B60S/1/08 |

* cited by examiner

*Primary Examiner*—Randy W. Gibson
*Assistant Examiner*—Eduardo Colon Santana
(74) *Attorney, Agent, or Firm*—Michael J. Striker

(57) ABSTRACT

The control device for a wiper device of a window wiper apparatus, especially of a motor vehicle, adapts set values of the wiping angle of the wiper arm to an actually measured operating point of the wiper arm during each wiper cycle. Because of that adaptation both over-wiping and also too little wiping of a wiped area by the wiper device is at least reduced so that the wiper accuracy particularly at the turning points of the wiper arm is improved. Furthermore a method for adjusting of a set value of the wiping angle of a wiper arm of a wiper device to actually existing operating conditions or to an actual operating point is provided.

21 Claims, 3 Drawing Sheets

CONTROL DEVICE AND METHOD FOR OPERATING A WINDOW WIPER APPARATUS WITH OPERATING-POINT-DEPENDENT WIPING ANGLE ADAPTATION

BACKGROUND OF THE INVENTION

1. Field of the Invention

The present invention relates to a control device for a window or windshield wiper apparatus with operating point-dependent wiping angle adaptation and to a method for operating this control device, and also to the wiper apparatus having the control device.

2. Description of the Related Art

A window wiper apparatus of a motor vehicle can be electronically controlled in order to optimize its operational behavior and properties. A certain set wiper arm course (set trajectory) is predetermined so that the wiper arm of the controlled window wiper apparatus has a desired course on the window of the motor vehicle. This predetermined wiper arm trajectory is usually stored in a control device of the window wiper apparatus. Various set wiper arm trajectories are provided, which are adapted to the several provided wiper speeds for the wiper arm. This adaptation is usually such that the turning point of the wiper arm at higher wiper speeds is reduced in comparison to the turning point at lower speeds.

High wiper speeds cause reduced friction moment between the wiper arm and the window, which itself causes increased wiper speeds of the wiper arm. Excessive oscillations of the wiper arm are compensated by the above-mentioned adaptation of the set wiper arm trajectory so that impacts of the wiper arm on the A-columns of the motor vehicle are prevented.

The desired wiping angle varies according to different operating conditions. These variations cause excessive wiping or insufficient wiping coverage of the desired wiped area. A wedge-shaped area on the window between the turning points is sometimes wiped and sometimes not wiped. With long wiper arms it can be especially large and optically troublesome. Furthermore the different sized wiped areas caused by the non-uniform wiping produce a notable operator discomfort during wiping. Finally these wedge-shaped regions must be considered during calculation of tolerances for the wiper field.

Control devices and methods for adaptation of the wiper arm trajectory by the window wiper apparatus are known in the state of the art. These control devices change the set wiper arm trajectory by including information regarding occurring set parameter limits. For example, EP-0700342 B1 discloses a method of this type, in which changes of the set wiper arm trajectories take place with the help of a commercially available control engineering method.

The textbook by Gerd Schulz, "Control Engineering (Regelungstechnik)" (Oldenbourg Press (Verlag), Munich, Wein, ISBN 3-486-25858-3) at pages 121 and following, provides examples or illustrations for state estimation by means of a state monitor.

SUMMARY OF THE INVENTION

It is an object of the present invention to provide a control method for a window wiper apparatus of the above-described type, which reacts better to changing wiper conditions.

It is another object of the present invention to provide a control device for a window wiper apparatus of the above-described type for performing the control method according to the invention, so that the wiper apparatus reacts better to changing wiper conditions.

The method of the invention controls operation of a wiper device of a window wiper apparatus, especially of a motor vehicle, in which a wiper arm of the wiper device oscillates over a wiping angle defined by two turning points. According to the invention this method comprises adaptation of a set value of the wiping angle to changing operating conditions with the help of a monitoring-assisted process.

The control device for a wiper device of a window wiper apparatus, especially of a motor vehicle, comprises means for controlling cyclic oscillation of at least one wiper arm of the wiper device over a wiping angle defined by two turning points. The control device according to the invention performs the method for adaptation of a set value of the wiping angle to changing operating conditions with the help of a monitoring-assisted process.

Preferred embodiments of the control device and method are described in the following description and claimed in the appended claims.

According to the invention the control device for controlling a wiper device of a window wiper apparatus, especially of a motor vehicle, comprises means for adaptation of a set value of the wiping angle. The adaptation advantageously occurs with the help of a monitoring-assisted process, which establishes the actual current operating point of the wiper arm. In this way both over-wiping and too little wiping of the wiper area can be prevented or at least reduced. The accuracy of the wiping of the wiper arm, especially at the turning points, is advantageously increased.

Advantageously the set value of the wiping angle as well as the course or trajectory of the wiper arm can be sufficiently adjusted to changing wiper conditions on the window. Hardly any-additional sensor technology is required in order to adjust the set value of the wiping angle at the existing operating point. Thus development and manufacturing efforts and costs connected with them are saved. The reproducibility of the wiping angle, especially at the turning points, advantageously increases by adjusting the wiping angle to the actual operating point of the wiper arm.

Even better, the control device according to the invention operates with the appropriate control method during each wiper cycle of the wiper arm, so that an individual wiper cycle defines a complete motion path or course of the wiper arm between two set turning points (upper and lower turning point) on the window.

Preferably the control device according to the invention determines dynamic properties of the window wiper apparatus with the help of a mathematical trajectory model for the wiper arm and stores them. Characteristics of an electric motor, as well as the elasticity and inertia of the window wiper apparatus, are formulated in the trajectory model.

Preferably the usually not measurable load moment on the wiper arm can be included as a perturbation, which acts on the trajectory model, by means of a mathematical model for the perturbation.

The actual load moment on the wiper arm can be determined in preferred embodiments of the method by means of an estimation process with the help of a state monitoring device. Additional state variables for the trajectory model, such as wiper arm acceleration or electric motor current, can be determined by means of additional sensor technology or by filtering already known measured variables.

Thus the operating point, at which the wiper arm actually is, together with the variables determined by the state monitor, the load moment on the wiper arm and the wiper speed (wiping angle rate of change), are sufficiently well known. Moreover with the help of a device for adaptation of a set value of the wiping angle the load moment on the wiper arm is evaluated and a set value of the wiping angle or the set turning points of the wiper arm is or are adapted to the established operating point.

Furthermore in additional preferred embodiments different measurement technology and signal processing signals are used as input variables for the state or condition monitor. Also an input voltage or an input current of the electric motor of the wiper device and a measured output signal of the wiper device, for example a rotation angle after the electric motor or after the gear unit, are numbered among the input variables.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
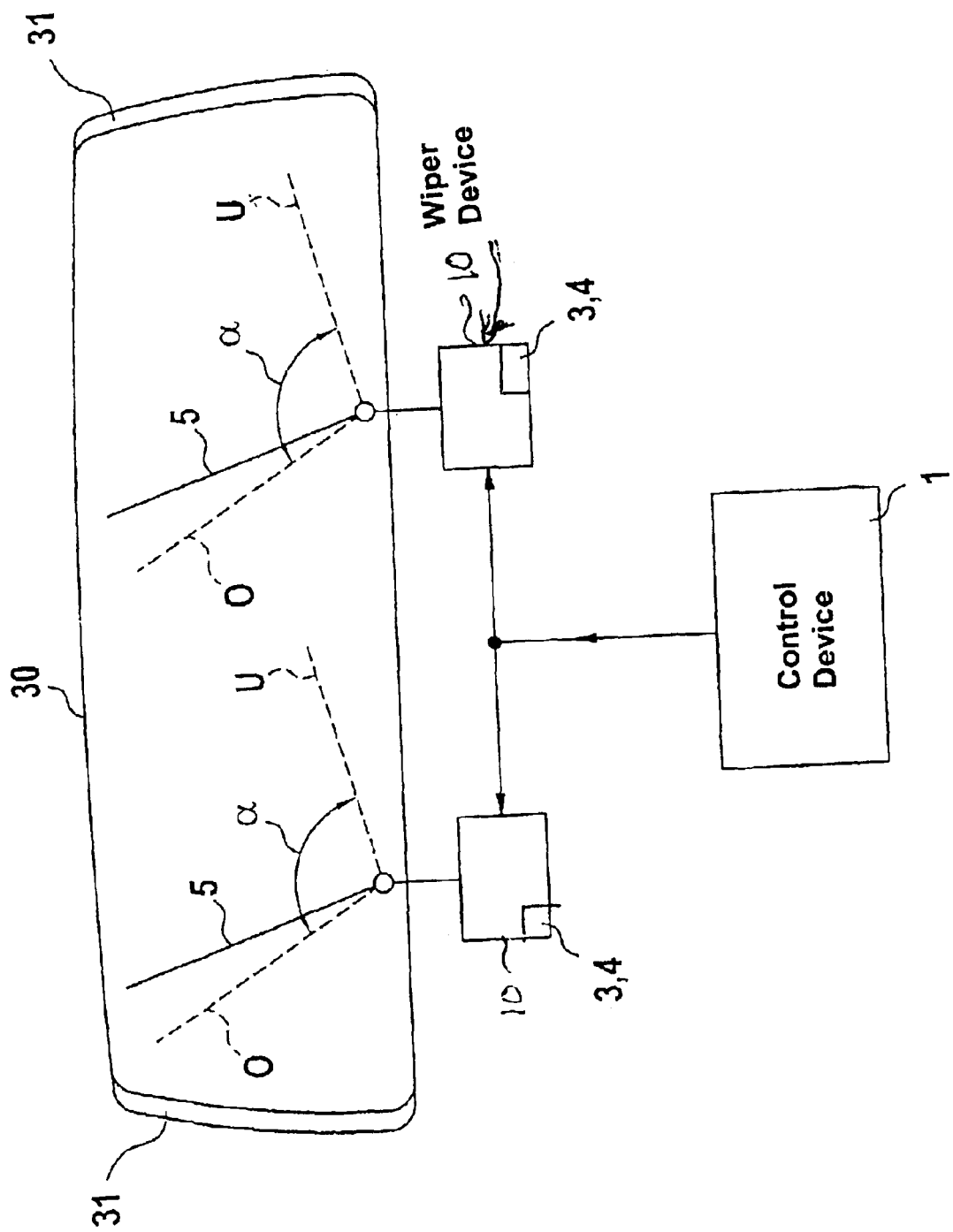
FIG. 1 is a diagrammatic view of a window wiper apparatus with a wiper device and a control device according to the invention for the wiper device.

FIG. 1 shows a schematic diagram of a window wiper apparatus of a motor vehicle, comprising a control device 1 according to the invention. The control device 1 is connected with two wiper devices, which each include an electric motor 3 and a gear unit 4. The control device 1, for example, together with the motors, can be constructed as a single unit. Each of these wiper devices serves for controlling a wiper arm 5. Both wiper arms 5 travel over a wiping angle α, which is determined by two set values O and U for the turning points, during wiping of the window or window 30. By definition the set value O is the set value for the upper turning point and the set value U is the set value for the lower turning point of the wiper arm. Two A-columns 31 bound the window 30 at its sides.

The load moment acting on the wiper arm 5 during wiping comprises static and dynamic components, such as friction load components and wind load components. This load moment is responsible in a measurable way for the accuracy of the wiping, above all at the set values of the turning points. Especially abrupt fluctuations of the load moment shortly prior to the turning points can considerably impair the process for maintaining the wiping angle α, especially the set values of the turning points, and thus the size of the wiped area.

In known control methods these problems cause the controller for the fluctuations of the load moment to only react in a delayed manner. This sort of fluctuation of the load moment can, for example, occur during wiping on a drying window, on which a thin water film is remaining on the edge during the course of the drying. This generally leads to over-wiping of the wiper arm in which the wiper arm moves beyond the desired set values of the turning points. On the other hand, because of a load increase, which results from deposits of snow or ice on the window, the wiper arm will no longer reach the set values O and U of the turning points. The load moment fluctuations on the wiper arm also finally result in an undesirable variation of the desired set course or trajectory of the wiper arm or the wiping angle. The turning points of the wiper arm also disadvantageously depend on the operating conditions in the known control process. Reproduction of the wiping angle or wiped area is poor in the conventional or prior art control process and is therefore undesirable.

According to the invention during wiping the load moment acting on the wiper arm is detected with the help of a monitor-assisted process. The measured load moment and variations of same are evaluated shortly prior to reaching the turning points. Based on the evaluation the set values O and U of the turning points are either shifted in the direction of the A-columns 31 or in the direction of the center of the window 30, i.e. away from the A-columns 31. The size of the shift depends on the operating or working point, at which the wiper arm 5 is actually found. The operating point is determined by the load moment and/or the actual load moment change and the actual wiping angle (actual value of the wiping angle) and/or the actual wiper speed.

Figure 2:
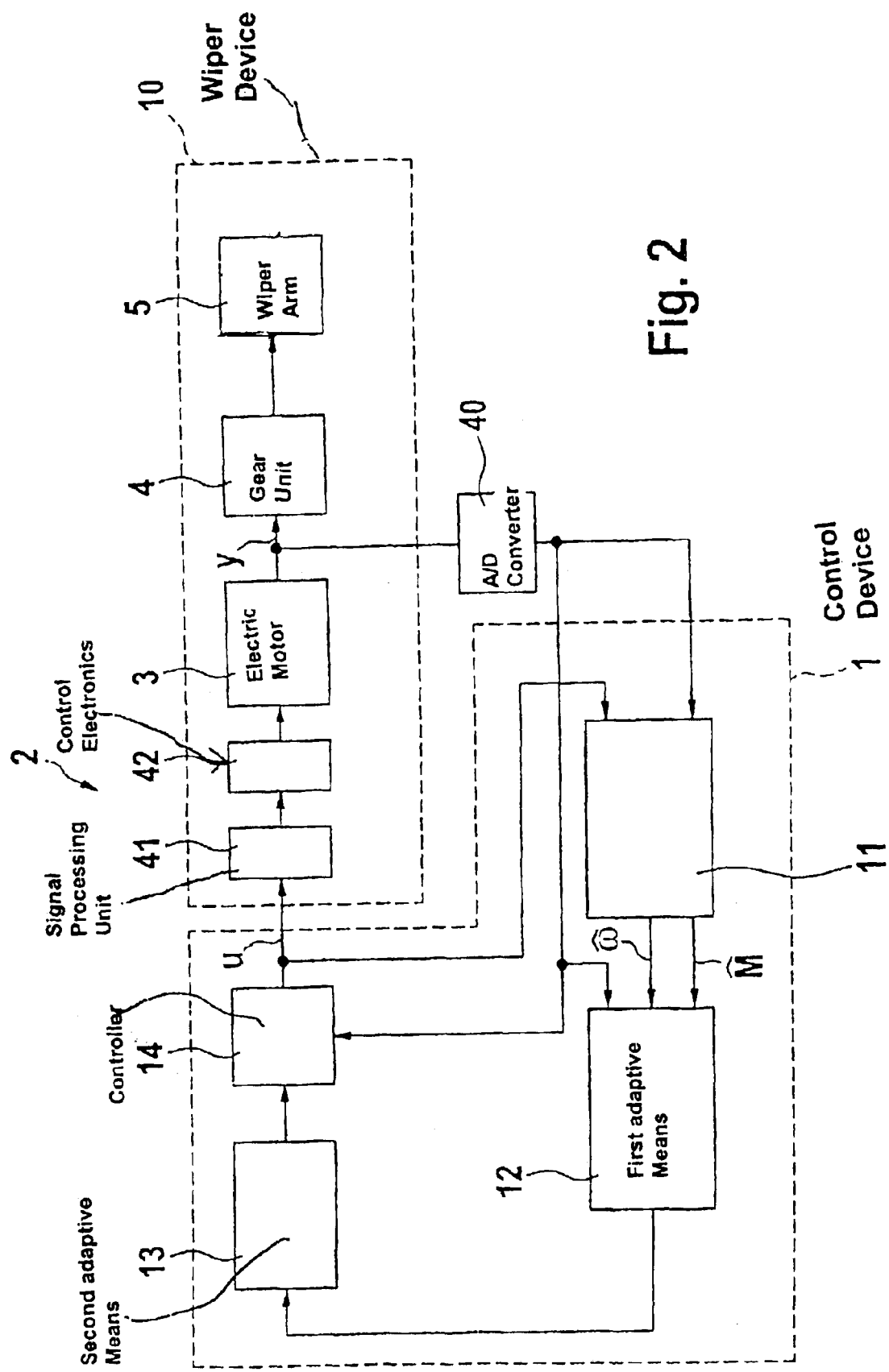
FIG. 2 is a signal-flow-oriented block diagram of the control device according to the invention and the wiper device.

FIG. 2 shows the control device 1 according to the invention in the form of a signal-flow-oriented block diagram. The control device 1 is connected with a wiper device 10 and controls it. The control device 1 and the wiper device 10 together form the window wiper apparatus 2. The wiper device 10 includes an electric motor 3, a gear unit 4 and the wiper arm 5. The electric motor 3 is connected by the gear unit 4 to the wiper arm 5 and controls it.

The control device 1 includes a state monitor 11, a first means 12 for adaptation of the wiping angle, second means 13 for adaptation of a set trajectory of the wiper arm and a controller 14. An output variable signal y, for example a rotation angle signal, converted to a digital signal from an analog voltage signal measured after the electric motor 3 by an analog-digital coverter 40, and an adjusting variable signal u, for example for control of the electric motor 3, are input to the state monitor 11. The state monitor 11 calculates an estimated value of the load moment $\hat{M}$ and an estimated value of the wiper angular speed $\hat{\omega}$. Then the state monitor 11 feeds the estimated values of the angular speed $\hat{\omega}$ and the load moment $\hat{M}$ to the first means 12 for adaptation of the wiping angle. The first means 12 then supplies a resulting output variable signal y for the electric motor 3, which is derived from these estimated values. From these estimated variables, the first means 12 ascertains the operating or working point of the wiper arm 5 at the current time during wiping.

The first means 12 for adaptation of the wiping angle evaluates the load moment according to the signal from the state monitor 11 and varies the set values of the turning points of the wiper arms based on this evaluation. The set values of the turning points are normally fixed with constant load moment on the wiper arm. With fluctuations of the load moment on the wiper arm immediately prior to the set values of the turning points, the set values of the turning points are compensated, either by shifting them in the direction of the A-columns 31 or in the direction of the center of the window. A suitable dependence of the operating point and shift of the set values of the turning points (change of the set course of the wiping angle) is stored in the first means 12 for the adaptation in tabular form.

The first means 12 for adaptation is connected with the second means 13 for adaptation. A set course for the wiping angle over time is stored in the second means 13 for adaptation or adjustment of a set trajectory. The set course of the wiping angle obtained from the first means is adjusted in the second means 13.

The second means 13 for adaptation is connected with the controller 14 and supplies a guidance variable for the wiping angle to the controller 14. The controller 14 supplies an adjusted or optimized adjusting variable signal u via a second signal processing device 41 and control electronics 42 to the electric motor 3.

In addition to the electrical control voltage for the electric motor and the measured rotation angle according to the present sensor technology, also other signals, such as a rotation speed or a current signal can be used as the input signals for the state monitor 11. Instead of the rotation angle signal measured after the electric motor 3 the rotation angle signal can also be measured after the gear unit 4.

Figure 3:
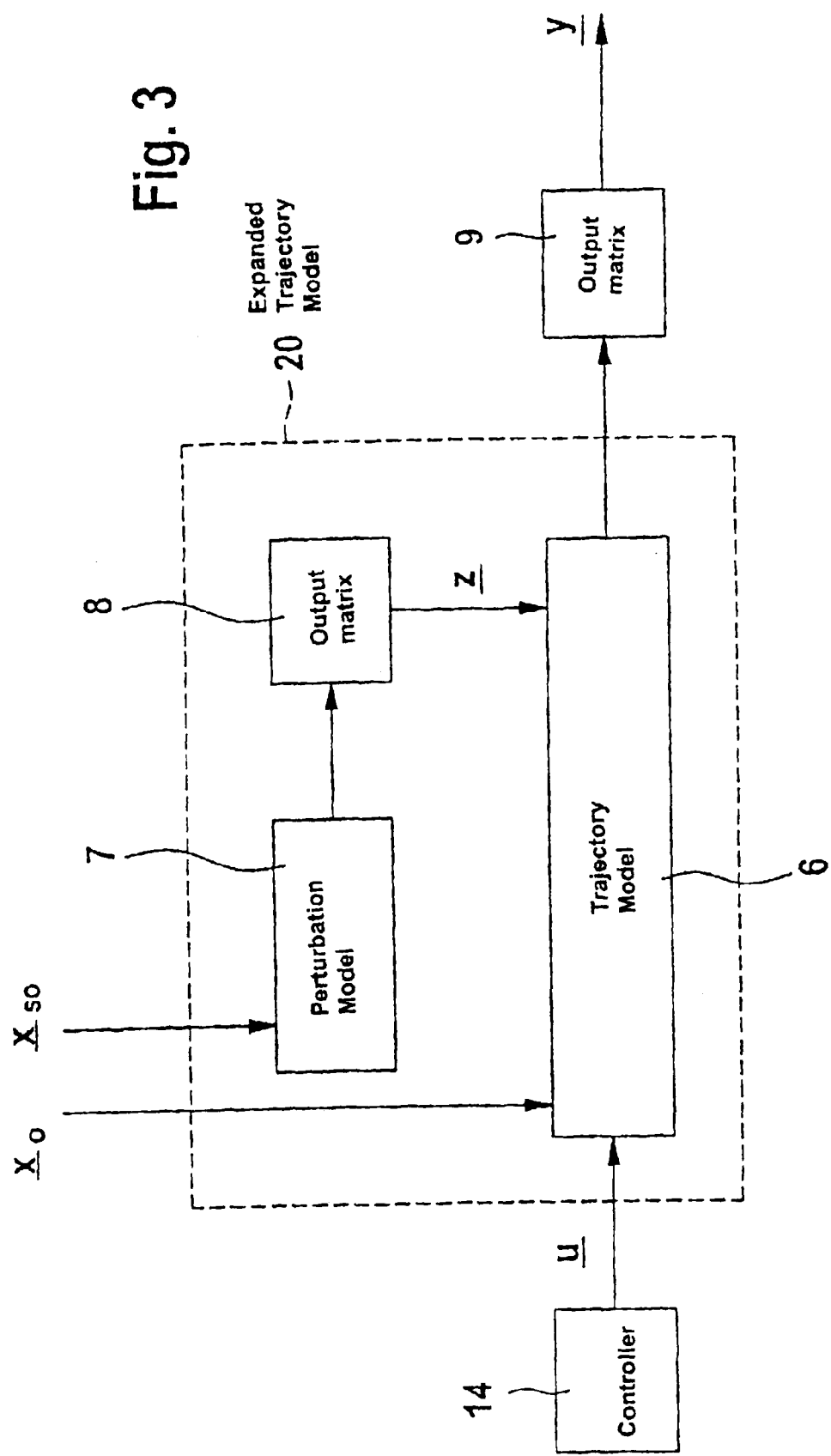
FIG. 3 is a principle illustration of an expanded mathematical trajectory model for the window wiper apparatus, comprising a model for the wiper apparatus operation or motions and a mathematical model for the perturbations.

In FIG. 3 a block diagram illustrates a mathematical trajectory model for the window wiper apparatus 2, which is stored in the control device 1. Essential dynamic properties of the window wiper apparatus 2 are formulated in or simulated in the control device with this mathematical trajectory model 6. This means that characteristics of the electric drive unit including the electric motor 3, such as elasticity of the gear unit 4 and the wiper arm 5 as well as its inertial moments can be considered.

The usually not measurable load moment acting on the wiper arm 5 is included in the formulation or simulation as a perturbing variable z of a perturbation model 7, which is also stored in the control device 1. The perturbing variable z acts on the trajectory model by means of an output matrix 8. A combination of the trajectory model 6, the perturbation model 7 and the output matrix 8 results in an expanded trajectory model 20. The output matrix 9 of the expanded trajectory model supplies the measured variable y.

The mathematical trajectory model for the wiper device 10 can preferably be described by the following mathematical equations:

Differential Equation of State:

$$\dot{x}_M = \underline{A}_M \underline{x} + \underline{B}_M \underline{u} + \underline{E} \underline{z} \tag{1}$$

Equation for the measured variables:

$$\underline{y} = \underline{C}_M \underline{x}_M \tag{2}$$

The perturbation model can be illustrated by the following:

$$\dot{\underline{x}}_S = \underline{A}_S \underline{x}_S, \; \underline{z} = \underline{C}_S \underline{x}_S \tag{3}$$

The individual parameters of the trajectory model and the perturbation model have the following significance:

| | |
|---|---|
| $x_M$ | State variable of the trajectory model |
| $x_0$ | initial value of the state variable of the trajectory model |
| $x_S$ | state variable of the perturbation model |
| $x_{S0}$ | initial value of the state variable of the perturbation model |
| u | positioning model |
| $\underline{A}_M$ | dynamic matrix of the trajectory model |
| $\underline{B}_M$ | input matrix of the trajectory model |
| $\underline{C}_M$ | output matrix of the trajectory model |
| $\underline{A}_S$ | dynamic matrix of the perturbation model |
| $\underline{E}$ | matrix, by which the perturbing variable z acts on the trajectory model |
| y | output variable |
| z | perturbing variable |

The combination of the trajectory model and the perturbation model results in the expanded trajectory model 20, which can be described with the following matrix equation (4):

$$\underbrace{\begin{bmatrix} \dot{x}_M \\ \dot{x}_S \end{bmatrix}}_{\dot{x}} = \underbrace{\begin{bmatrix} \underline{A}_M & \underline{E}\underline{C}_S \\ 0 & \underline{A}_S \end{bmatrix}}_{\underline{A}} \underbrace{\begin{bmatrix} \underline{x}_M \\ \underline{x}_S \end{bmatrix}}_{\underline{x}} + \underbrace{\begin{bmatrix} \underline{B}_M \\ 0 \end{bmatrix}}_{\underline{B}} u \tag{4}$$

$$\underline{y} = \underbrace{[\underline{C}_M \; 0]}_{\underline{C}} \begin{bmatrix} \underline{x}_M \\ \underline{x}_S \end{bmatrix}.$$

With the help of the state monitor 11 (e.g. Luenberger monitor or Kalman filter), which preferably can be described with the following equations (5):

$$\dot{\hat{x}} = (\underline{A} - \underline{L}\underline{C})\hat{\underline{x}} + \underline{B}\underline{u} + \underline{L}\underline{y} \tag{5}$$

$$\hat{\underline{y}}_B = \underline{C}_B \hat{\underline{x}} + \underline{D}_B \underline{u}$$

the state variables of the expanded trajectory model 20 can be estimated. In this equation L is a variable to be defined in the planning of the state monitor. The load moment, which acts on the wiper arm 5, is available as an output variable $y_B$ of the state monitor 11, with a suitable formulation of the monitoring matrices $C_B$ and $D_B$ besides the measured output variables (e.g. the rotation angle).

The control device according to the invention can be used both for control of an individual wiper arm 5 and also for control of several wiper arms of the window wiper apparatus.

Furthermore it is possible to use the control device according to the invention for several window wiper apparatuses.

In addition it is also possible to use the control device according to the invention during arbitrarily defined wiper cycles during wiping with the wiper arm with suitable methods.

The disclosures in German Patent Applications 102 50 322.2 of Oct. 29, 2002 and 101 62 677.0 of Dec. 19, 2001 are incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a control device and method for operating a window wiper with operating-point-dependent wiping angle adaptation, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A control device for a wiper device (10) of a window wiper apparatus (2), said control device (1) comprising means for controlling a cyclic oscillation of at least one wiper arm (5) of the wiper device (10) over a wiping angle (α) defined by two turning points (O, U), wherein the control device (1) performs an adjustment of a set value of the wiping angle (α) to changing operating conditions by means of a monitoring-assisted process and a mathematical trajectory model (6) of dynamic properties of the window wiper apparatus (2) formulated in the control device (1), wherein the wiper device (10) includes at least one motor (3) for driving said at least one wiper arm (5) and said dynamic properties include a characteristic of said at least one motor, elasticity of the control device and inertial moments of the control device and a load moment, said load moment being defined as a perturbing variable of the trajectory model (6).

2. The control device as defined in claim 1, wherein said trajectory model in said control device (1) is represented by the following equation (1):

$$\underline{x}_M = \underline{A}_M \underline{x} + \underline{B}_M \underline{u} + \underline{E} \underline{z} \quad (1),$$

wherein $A_M$ is a dynamic matrix of the trajectory model (6),

E is an input matrix of the trajectory model (6), and

E is a matrix, by which the perturbing variable acting on the trajectory model (6), is defined.

3. The control device as defined in claim 1, wherein a perturbation model acting on the trajectory model is provided in the control device.

4. The control device as defined in claim 3, wherein the perturbation model is described by the following equation (2):

$$\underline{x}_S \underline{A}_S \underline{x}_S, \ \underline{z} = \underline{C}_C \underline{x}_S \quad (3),$$

wherein $A_S$ is a dynamic matrix of the perturbation model (7), $C_S$ is an output matrix of the perturbation model (7) and z is the perturbing variable.

5. The control device as defined in claim 4 wherein said control device includes a state monitor (11) described by the following equations (5):

$$\hat{\underline{x}} = (\underline{A} - L\underline{C})\hat{\underline{x}} + B\underline{u} + L\underline{y} \quad (5),$$

$$\hat{\underline{y}}_B = \underline{C}_B\hat{\underline{x}} + \underline{D}_B\underline{u}$$

wherein L is a variable to be defined in planning of the state monitor and u is an input variable for the state monitor (11).

6. The control device as defined in claim 5, wherein said input variable is at least one of a control voltage of the wiper device, an Input current of the wiper device and a rotation angle of a part of the window wiper apparatus.

7. The control device as defined in claim 1, wherein said window wiper apparatus is a windshield wiper apparatus for a motor vehicle.

8. A window wiper apparatus comprising
a wiper device (10) including at least one wiper arm (5) and at least one motor (3) for driving said at least one wiper arm (5) with a cyclic oscillation over a wiping angle (α) defined by two turning points (O, U); and
a control device (1) comprising means for controlling said cyclic oscillation of said at least one wiper arm (5) according to set values (O, U) of said turning points, wherein the control device (1) Includes means for adaptation of said set values of said turning points to changing operating conditions by means of a monitoring-assisted process;
whereby accuracy of said wiping angle in successive cycles during driving of said it least one wiper arm is at least improved despite the changing operating conditions; and
wherein a mathematical tralectory model (6) of dynamic properties of the window wiper apparatus (2) is formulated and stored in the control device (1), wherein the dynamic properties include a characteristic of said at least one motor, elasticity of the control device and inertial moments of the control device and a load moment, said load moment being defined as a perturbing variable of the trajectory model (6).

9. The window wiper apparatus as defined in claim 8, wherein said trajectory model in said control device (1) is represented by the following equation (1):

$$\underline{x}_M = \underline{A}_M \underline{x} + \underline{B}_M \underline{u} + \underline{E} \underline{z} \quad (1),$$

wherein $A_M$ is a dynamic matrix of the trajectory model (6), $B_M$ is an input matrix of the trajectory model (6), and E if is a matrix, by which the perturbing variable acting on the trajectory model (6), is defined.

10. The window wiper apparatus as defined in claim 8, wherein a perturbation model acting on the trajectory model is provided in the control device.

11. The window wiper apparatus as defined in claim 10, wherein the perturbation model is described by the following equation (2):

$$\underline{x}_S = \underline{A}_S \underline{x}_S, \ \underline{z} = \underline{C}_S \underline{x}_S \quad (3),$$

wherein $A_S$ is a dynamic matrix of the perturbation model (7), $C_S$ is an output matrix of the perturbation model (7) and z is the perturbing variable.

12. The window wiper apparatus as defined in claim 10, wherein said control device (1) includes a state monitor (11) described by the following equations (5):

$$\hat{\underline{x}} = (A - L\underline{C})\hat{x} + B u + L\underline{y} \quad (5),$$

$$\hat{\underline{y}}_B = \underline{C}_B\hat{x} + \underline{D}_B u$$

wherein L is a variable to be defined in the planning of the state monitor and u is an input variable for the state monitor (11).

13. The window wiper apparatus as defined in claim 12, wherein said input variable is at least one of a control voltage of the wiper device, an input current of the wiper device and a rotation angle of a part of the window wiper apparatus.

14. The window wiper apparatus as defined in claim 8, consisting of a windshield wiper apparatus for a motor vehicle.

15. A method of controlling a wiper device (10) of a window wiper apparatus (2), said method comprising controlling oscillations of at least one wiper am, (5) of the wiper device (10) so that the oscillations are kept within a wiping angle (α) defined by two set values (O, U) for turning points of the at least one wiper arm, wherein the method adjusts a set value of the wiping angle (α) to changing operating conditions by means of a monitoring-assisted process; and formulating trajectory model (6) for dynamic properties of the wiper device (10) and wherein said dynamic properties include elasticity and inertial moments of the at least one wiper of the wiper device (10) further comprising formulating a perturbation model (7), which includes a load moment acting on the at least one wiper arm as a perturbing variable for the trajectory model (6).

16. The method as defined in claim 15, wherein said load moment is ascertained from a control signal (u) for the wiper device (10) and an output signal (y) of the wiper device.

17. The method as defined in claim 16, wherein the control signal (u) is a voltage or current signal and the output signal (y) is a rotation angle signal.

18. The method as defined claim 15, wherein the trajectory model (6) is represented by the following equation (1):

$$\underline{x}_M = \underline{A}_M x + \underline{B}_M \underline{u} + \underline{E}z \tag{1}$$

wherein $A_M$ is a dynamic matrix of the trajectory model (6),
$B_M$ is an input matrix of the trajectory model (6), and
E is a matrix, by which the perturbing variable acting on the trajectory model (6), is defined.

19. The method as defined by 18, wherein the perturbation model is described by the following equation (2):

$$x_S = A_S x_S \cdot {}^{z=C}{}_S x_S \tag{3}$$

wherein $A_S$ is a dynamic matrix of the perturbation model (7), $C_S$ is an output matrix of the perturbation model (7) and z is the perturbing variable.

20. The method as defined by claim 18, wherein the perturbation model is described by the following equations (5):

$$\hat{\underline{x}} = (\underline{A} - \underline{L}\,\underline{C})\hat{x} + \underline{B}\,\underline{u} + \underline{L}\underline{y} \tag{5}$$

$$\hat{\underline{y}}_B = \underline{C}_B \hat{x} + \underline{D}_B \underline{u}$$

wherein L is a variable to be defined in the planning of the state monitor and u is an input variable for the state monitor (11).

21. The method as defined in claim 20, wherein said input variable is at least one of a control voltage of the wiper device, an input current of the wiper device and a rotation angle of a part of the window wiper apparatus.

* * * * *